(No Model.)
W. G. FREDERICK.
ANTI FREEZING ATTACHMENT FOR WATER PIPES.
No. 317,331. Patented May 5, 1885.
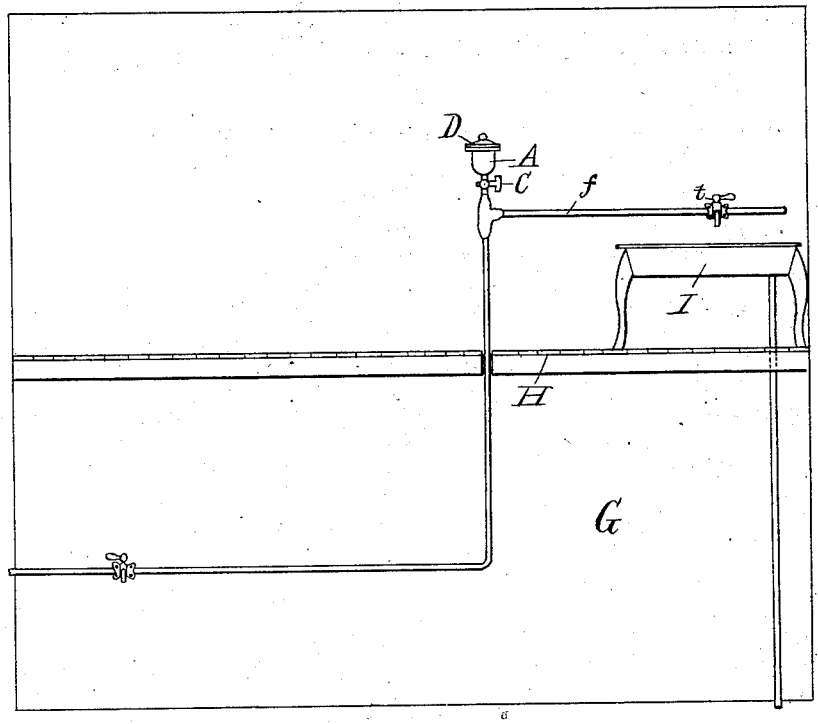
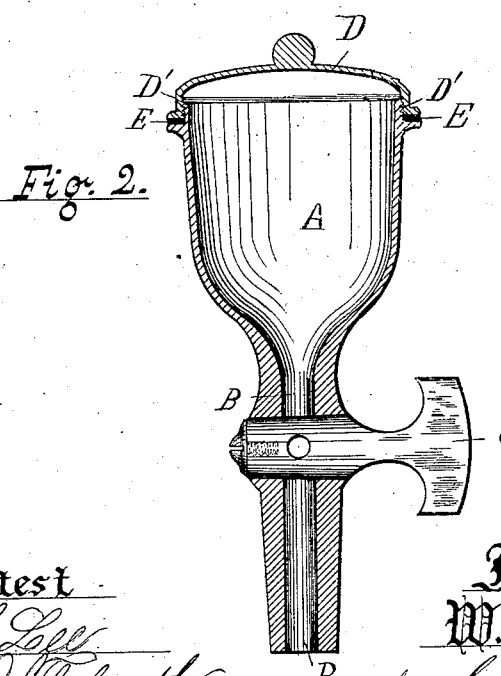
Attest
L. Loff
Henry J. Sheberath
Inventor.
W. G. Frederick,
per Crane & Miller, Attys

United States Patent Office.

WILLIAM G. FREDERICK, OF NEWARK, NEW JERSEY.

ANTI-FREEZING ATTACHMENT FOR WATER-PIPES.

SPECIFICATION forming part of Letters Patent No. 317,331, dated May 5, 1885.

Application filed January 15, 1885. (No model.)

*To all whom it may concern:*

Be it known that I, WILLIAM G. FREDERICK, a citizen of the United States, residing in Newark, Essex county, New Jersey, have invented certain new and useful Improvements in Anti-Freezing Attachments for Water-Pipes, fully described and represented in the following specification and the accompanying drawings, forming a part of the same.

This invention consists in the combination, with a pipe containing water under pressure—such as is used for supplying dwellings and factories—of a feeding-vessel having two apertures and means for closing them tightly, the anti-freezing solution being introduced into the feeder through one of said apertures, which is then closed, the other being then opened to establish a communication with the water-pipe. This construction affords a means of preventing the escape of water from the pipe when introducing the solution into the feeder without shutting off the water-pressure, as has been common heretofore.

My invention will be understood by reference to the annexed drawings, in which Figure 1 is a sectional elevation of the cellar and first story of a building with water-supply pipe and sink; and Fig. 2 is a longitudinal section of the feeder before application to the water-pipes, the same being shown connected in the water-pipe in Fig. 1 by a wiped joint, such as is commonly used in attaching brass fixtures to lead pipes.

My invention is based upon the fact that a solution of salt or other suitable chemical operates equally to thaw water already frozen, or to prevent such freezing if introduced into the water and retained in solution before the water is reduced in temperature.

It is obvious that where water is held under pressure, as in the system of closed pipes employed in the city aqueduct, no opening could be made directly in the pipes for introducing an anti-freezing solution without an immediate discharge of water, which would prevent the introduction of any liquid at such point; and my invention is therefore especially constructed to introduce the solution without permitting such discharge. It is also obvious that when the water in the pipes is frozen without any rupture of the same a thawing solution may be introduced at an aperture from which the thawed fluid could be prevented from escape by tightly closing said aperture after the introduction of the solution.

The apparatus required for introducing the fluid to prevent freezing may therefore be used for thawing water already frozen in the pipe, and is shown in its simplest form in Fig. 2, where A represents a cup-shaped vessel provided with an outlet aperture, B, and a cock, C, for closing the same. It is also provided with a cap, D, fitted to the top by means of a screw-thread, D', and packing-ring E, by which the cover can be made air-tight.

In Fig. 1 the feeder A is shown attached to a water-pipe, $f$, which is represented as entering a cellar, G, passing part through a floor, H, and extending to a sink, I, where it is furnished with a tap, $t$. In such a situation the solution may be introduced into the pipe while the water is under pressure therein by closing the cock C, removing the cap D, placing the solution into the feeder A, securing the cap tightly upon the packing E, and then opening the cock C. The solution would then gradually work into the pipe $f$ by virtue of its dissimilar character or superior gravity, and the water in the pipe would be prevented from freezing within a certain distance of the feeder, depending upon the size of the latter and the amount of solution introduced.

It is obvious that the solution would be soon discharged from the pipe when the tap $t$ was first opened, and that pure water would thereafter flow from the same. Should the water in the pipe freeze at any time before the introduction of the solution, the latter could be supplied to the feeder in the manner already described, and would flow into the pipe upon the opening of the cock C, and operate, as I have discovered by frequent tests, to thaw the ice in the pipe most effectually, the extent of its operation being dependent upon the quantity of the solution employed.

Any chemicals besides a solution of the common chloride of sodium, and which will effect analogous results, may be employed to practice my invention, and the diffusion of such substance through the water in such a system of closed pipes is effected by a principle well understood in chemistry, and which will lead solutions of different quality to penetrate entirely through a moistened membrane in their tendency to mingle with one another.

From the above description it will be seen that the exact form of the feeder is not material, and that it may be provided with a cock at the top as well as at the bottom, and the solution be introduced through a funnel or feeding-pipe, if desired.

It will also be seen that my invention consists, essentially, in a means of preventing the escape of water under pressure in a pipe when thawing the same, or when introducing a solution to prevent the freezing of its contents.

I am fully aware that various receptacles have been used to apply a solution to pipes not under pressure; but my invention differs, essentially, from such devices as are shown in United States Patents Nos. 168,353, 243,002, 299,352, and 300,574, and which cannot be applied to a system of closed pipes containing water under pressure for want of the cock between the feeding-vessel and the inlet to the said pipes. They therefore require the water-pressure to be cut off from the closed pipe before introducing the solution, and cannot operate, as claimed, for my invention. I therefore entirely disclaim such constructions, and restrict my invention to the construction herein shown and described.

What I claim is—

The combination, with the water-supply pipe containing water under pressure, of the feeder A, provided with two apertures and means for tightly closing the same, one aperture being connected with the pipe, as set forth, and the other adapted for introducing an anti-freezing solution into the feeder, the whole being arranged and operated for introducing an anti-freezing solution into the fluid under pressure within the water-pipe, as and for the purpose set forth.

In testimony whereof I have hereunto set my hand in the presence of two subscribing witnesses.

WILLIAM G. FREDERICK.

Witnesses:
HENRY F. GÖKEN,
HENRY J. MILLER.